United States Patent
Wrolstad et al.

(12) 
(10) Patent No.: US 6,224,926 B1
(45) Date of Patent: May 1, 2001

(54) NATURAL ANTIBROWNING AND ANTIOXIDANT COMPOSITIONS AND METHODS FOR MAKING THE SAME

(75) Inventors: Ronald E. Wrolstad; Ling Wen, both of Corvallis, OR (US)

(73) Assignee: The State of Oregon Acting By and Through the State Board of Higher Education on Behalf of Oregon State University, Portland, OR (US)

(*) Notice: Subject to any disclaimer, the term of this patent is extended or adjusted under 35 U.S.C. 154(b) by 0 days.

(21) Appl. No.: 09/378,986

(22) Filed: Aug. 23, 1999

(51) Int. Cl.$^7$ ................................. A23B 7/14; A23L 3/34
(52) U.S. Cl. ..................... 426/262; 426/268; 426/270; 426/310; 426/541; 426/542; 426/544; 426/545; 426/442; 426/478; 426/489; 426/490
(58) Field of Search ..................................... 426/262, 268, 426/270, 310, 541, 542, 544, 545, 442, 478, 490, 489

(56) References Cited

PUBLICATIONS

Abdulla, Sara, "Staying Delicious," Internet, Nature Science Update, 1999.

Elkins, Edgar R., Final Report "Characterization of Commercially Produced Pineapple Juice Concentrate," National Food Processors Association, Dec. 1996.

Lozano–De–Gonzalez, Patricia G. et al., "Enzymatic Browning Inhibited in Fresh and Dried Apple Rings by Pineapple Juice," Journal of Food Science, 58(2): 399–404, 1993.

Weaver, Connie Marie, Internet, The Food Resource, Information on Enzymatic Browning, "Factors Influencing Enzymatic Browning of Ripening Bananas," Department of Food and Nutrition, Oregon State University Master of Science Thesis, 1974.

Wen, Ling et al., Poster Presentation at American Chemical Society Meeting, Boston, MA, "Characterization of Sinapyl Derivatives in Pineapple Juice," Aug. 23–27, 1998.

Wen, Ling et al., "Characterization of Sinapyl Derivatives in Pineapple (*Ananas comosus* [L.] Merill) Juice," J. Agric. Food Chem., 47(3):850–853, Feb. 1999.

L. Wen and R.E. Wrolstad, Phenolics Composition of Pineapple Juice Concentrate, IFT Meeting (Jun. 21, 1998).

*Primary Examiner*—Milton Cano
(74) *Attorney, Agent, or Firm*—Klarquist Sparkman Campbell Leigh & Whinston, LLP

(57) ABSTRACT

The present invention, provides natural-source compositions having consistent, effective antibrowning and antioxidant characteristics. Additionally, the present invention provides methods for making the antibrowning/antioxidant compositions of the present invention. More specifically, the present invention provides natural-source, browning and oxidizing inhibitor compositions comprising S-sinapyl-L-cysteine, N-L-γ-glutamyl-S-sinapyl-L-cysteine, S-sinapyl glutathione, or various mixtures thereof. Methods for making such natural, antibrowning/antioxidant compositions from pineapple juice and/or from pineapple processing plant waste streams include efficient and effective separation of the present invention compositions from unwanted sugars, acids, phenolic compounds, and other undesirable compounds present in pineapple juice and/or pineapple processing plant waste streams.

22 Claims, 3 Drawing Sheets

NATURAL ANTIBROWNING AND ANTIOXIDANT COMPOSITIONS AND METHODS FOR MAKING THE SAME

FIELD OF THE INVENTION

This invention relates to natural antibrowning, antioxidant compositions for foods, and methods for making the same.

BACKGROUND AND SUMMARY OF THE INVENTION

The food industry is concerned with how quickly most fruits (and various fruit products) become discolored upon exposure to air. The discoloration upon exposure to air is caused by a chemical reaction known as oxidation. Oxidation (typically indicated by discoloration) of fruits involves an enzyme-catalyzed oxidation of phenolic compounds present in the fruit. Browning of fruits is also a concern of the food industry. Browning of a fruits typically occurs following a mechanical injury to the fruit, such as during the harvesting or processing of such foods.

Bisulfite compounds are currently used to inhibit the enzymatic oxidation and browning in "fresh-cut" and processed fruits. Since a segment of the population is hypersensitive to sulfites, however, food processors prefer to avoid using sulfite compounds. Further, concern over labeling requirements for sulfur dioxide (due to allergic reactions by many users) also causes food processors to avoid its usage. It is particularly desirable in the food industry that an oxidation/browning inhibitor composition be derived from a natural source, rather than a synthetic chemical. That is, main-line food processing companies are seeking effective, natural alternatives to synthetic food additives. Additionally, the FDA typically requires less extensive testing information for a preparation derived from a natural source than for a preparation derived from a synthetic chemical. This is particularly true if the "natural source" is a common foodstuff.

Other currently available oxidation and browning inhibitors include, for example, 4-hexyl resorcinol, sulfurdioxide metal chelators such as citric acid and phosphates in combination with ascorbic acid. Oxidation and browning inhibitors such as citric acid and phosphates in combination with ascorbic acid, however, are not sufficiently effective. The use of inhibitor 4-hexyl resorcinol is limited in the United States to use with shrimp. Additionally, even if 4-hexyl resorcinol is approved for use with fruits and fruit products, many food processors will likely be reluctant to use it because it is derived from a synthetic chemical rather than from a natural source.

Pineapple juice has also been shown to inhibit browning and oxidation of fresh fruit (P. G. Lozano-de-Gonzalez, D. M. Barrett, R. E. Wrolstad, and R. W. Durst, Enzymatic Browning Inhibited in Fresh and Dried Apple Rings by Pineapple Juice, J. Food Sci. Vol. 58, pp. 399–404 (1993)). The antibrowning/antioxidant effectiveness of pineapple juice is, however, unacceptably variable for use in the food industry. That is, the effectiveness of pineapple juice for such purposes varies from one type of pineapple to another, and from one pineapple to another within a particular pineapple type. The effectiveness of the pineapple juice as an antibrowning/antioxidizing agent also varies depending upon where the pineapple was grown.

The present invention provides natural-source compositions having effective and consistent antibrowning and antioxidant characteristics. Additionally, the present invention provides methods for making the antibrowning/antioxidant compositions of the present invention. More specifically, the present invention provides natural browning and oxidizing inhibitor compositions comprising S-sinapyl-L-cysteine, N-L-γ-glutamyl-S-sinapyl-L-cysteine, S-sinapyl glutathione, or various mixtures thereof.

Methods for making such natural, antibrowning/antioxidant compositions from pineapple juice and/or from pineapple processing plant waste streams are also provided. The present invention provides methods for making antibrowning/antioxidant compositions that are efficiently and effectively separated from sugars, acids, and other phenolic compounds present in pineapple juice and/or pineapple processing plant waste streams.

More specifically, one method of the invention generally includes centrifuging and filtering a quantity of pineapple juice to obtain a filtrate. The filtrate is applied to a resin column. The resin column is washed with acidified water to remove undesirable constituents, such as sugars, acids, and other polar compounds. The constituents of the antibrowning/antioxidant compositions are eluted from the column using a suitable media such as an alcohol. The eluate constituents are evaporated to dryness and re-dissolved in a liquid, such as water. The re-dissolved constituents are applied to an anion-exchange resin column. The anion-exchange resin column is washed to remove undesirable, neutral phenolic compounds. The anion-exchange resin column is then treated with an acidic liquid, such as sulfuric acid. The acidic liquid elutes the remaining constituents from the column to produce an eluate. The eluate is neutralized to form one of the present invention antibrowning/antioxidant compositions. One or more of the individual constituents of the neutralized eluate may be isolated to make alternative embodiments of the antibrowning/antioxidant compositions of the present invention.

The foregoing and other features and advantages of the present invention will become more apparent from the following detailed description, drawings, and examples of the browning, oxidation inhibiting compositions and methods for preparing the same.

DETAILED DESCRIPTION

Figure 1:
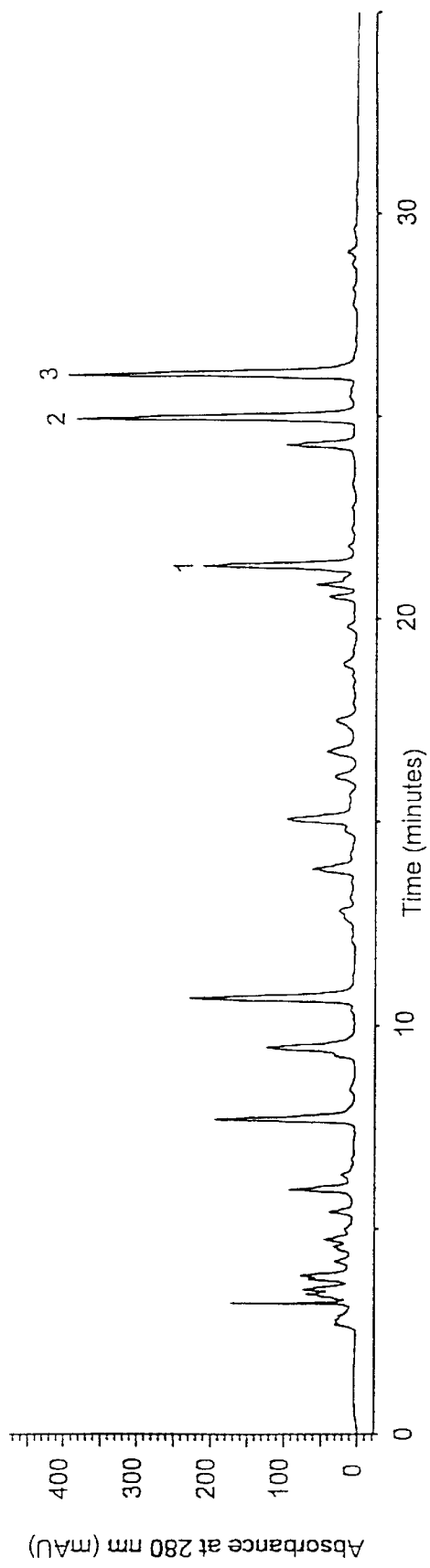
FIG. 1 is a HPLC chromatogram of an antibrowning/antioxidant composition of the present invention.

The present invention provides natural antibrowning and antioxidant compositions for use with fruits and fruit products.

As used herein, "antibrowning" means the reduction of or substantial inhibition of browning of fruits exposed to mechanical injury. Also as used herein, "antioxidizing" means the reduction of or substantial inhibition of oxidation (i.e., the ability to trap free-radicals) of fruits exposed to air or other oxygen sources.

As used herein, an "isolated" constituent or component means a constituent of pineapple juice that has been substantially separated from other constituents in pineapple juice. The terms "substantially separated," "purified" or "purified component" do not mean absolute purity or separation. Rather, the substantial separation, purification or purity of a component mean more concentrated than when in a prior solution from which the component was separated. Thus, for example, a purified phenolic compound is a phenolic compound wherein the concentration of the phenolic compound is greater than the concentration of the phenolic compound when in its natural environment, such as in pineapple juice.

Also as used herein, a "natural" antibrowning/antioxidizing composition is a composition isolated from a natural source rather than a synthetic source. Natural source food preparations are much more readily received by the consumers and, thus, the food processors. That is, a significant portion of the consuming public has the perception that food additives or food preparatives from a natural source are better for health reasons than synthetic additives and preparatives.

Antibrowning and antioxidant capabilities of a composition is typically determined by comparison to the antibrowning and antioxidant capabilities of TROLOX. TROLOX, an excellent antioxidant, is a water-and methanol-soluble analog of alpha-tocopherol (i.e., 6-hydroxy-2,5,7,8-tetramethylchroman-2-carboxylic acid) available from Aldrich of Milwaukee, Wis. TROLOX is widely used by persons skilled in the art, as a reference standard for measuring comparative antioxidant capacity. TROLOX has an activity equal to 1 in comparison to other antibrowning/antioxidant compositions. The antioxidant capacity (AOC) of a composition is referred to as a TEAC value, i.e., TROLOX Equivalent of Antioxidant Capacity. In other words, the antioxidant capacity of a composition is typically expressed as the calculated molar amount of TROLOX with AOC corresponding to 1 mole of assayed composition.

Specifically, a photo-chemiluminometer is typically used to measure the antioxidant capacity of particular compositions. Such a technique permits measurement of antioxidant capacity of water-soluble, lipid-soluble, and protein-associated compositions. Using such techniques, superoxide radicals are generated in a photo-sensitizer (e.g., luminol) solution using ultra-violet irradiation. The antioxidant capacity is measured as inhibition of light output: $I=1-A/A_O$ wherein A is equal to the area under the chemiluminescense emission curve and is expressed as TROLOX Equivalent of Antioxidant Capacity (i.e., TEAC).

The antioxidant capacity of compositions is also often determined by measuring the compositions' oxygen-radical absorbance capacity (ORAC). Quantitating the ORAC of antioxidants is based on the use of beta-phycoerythrin (beta-PE) as an indicator protein, 2,2'-azobis(2-amidinopropane) dihydrochloride (AAPH) as a peroxyl radical generator, the TROLOX as a control standard. As in the TEAC assay, results are expressed relative to the antioxidant activity of TROLOX, where 1 ORAC unit equals the net protection produced by 1 $\mu$M TROLOX.

The natural antibrowning and antioxidant compositions of the present invention comprise at least one compound having antibrowning/antioxidizing properties. The compositions of the present invention may be made from natural sources, such as pineapples, pineapple juice, or pineapple process plant waste streams. The antibrowning/antioxidizing compositions include S-sinapyl-L-cysteine, S-sinapyl glutathione, N-L-γ-glutamyl-S-sinapyl-L-cysteine, or various combinations of these sinapyl compounds (having various relative concentrations of the sinaply compounds).

S-sinapyl-L-cysteine is typically a slightly yellow solid having a chemical structure substantially as shown in FORMULA 1.

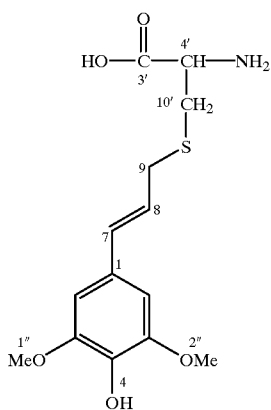

FORMULA 1 wherein MeO and OMe represent methoxy groups.

S-sinapyl glutathione is typically a slightly yellow solid having a chemical structure substantially as shown in FORMULA 2.

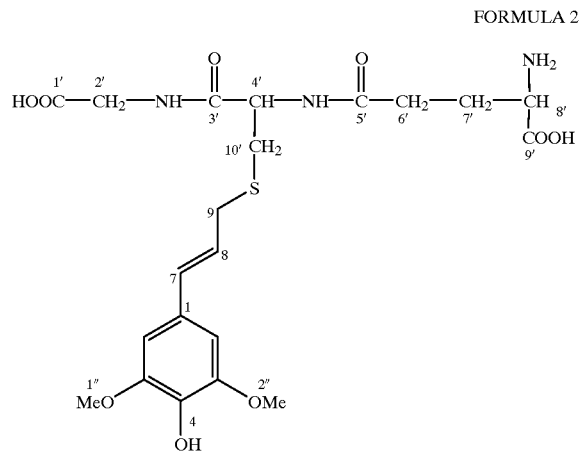

FORMULA 2 wherein MeO and OMe represent methoxy groups.

N-L-γ-glutamyl-S-sinapyl-L-cysteine is typically a slightly yellow solid having a chemical structure substantially as shown in FORMULA 3.

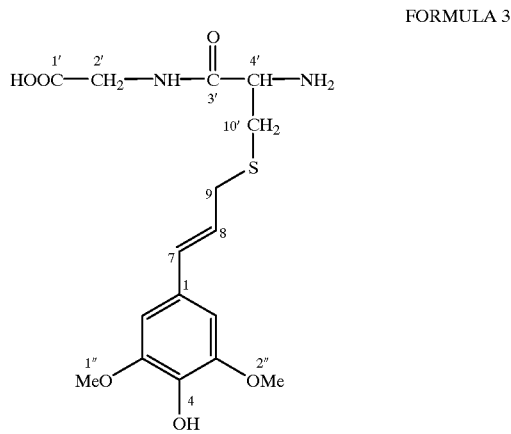

FORMULA 3 wherein MeO and OMe represent methoxy groups.

Methods for making the antibrowning, antioxidant compositions of the present invention generally comprise isolation of desirable constituents of extracted pineapple juice and/or pineapple processing waste streams. Although any type of pineapple may be used to practice the methods of the present invention, pineapples found to be useful in practicing the methods include: champaka, cayenne, champaka-smooth cayenne, cayena Lisa, cayenne F-200, and smooth cayenne. Likewise, waste streams from the processing of such pineapples may also be used to make the compositions of the present invention.

Suitable pineapples may first be washed with water or chlorinated water to eliminate extraneous matter and particulates. The pineapples (or pineapple waste stream solutions) may be stored at about 4° C. until the pineapples (or waste stream solutions) are to be treated. Alternatively, the pineapples (or waste stream solutions) may be treated immediately following the wash. The pineapple skins and tops may be removed. The pineapples are then preferably cut into smaller pieces, ground, or pureed. It may be less efficient to extract a whole pineapple.

The pineapple pieces or puree may then be extracted to obtain a pineapple juice solution. Typically, the pineapple pieces or puree are pressed using a conventional juice hydraulic press. The pineapple juice concentrate is diluted with deionized water. Dilution of the pineapple concentrate is preferable as the concentrate is typically too viscous for efficient subsequent filtration and resin treatments. Single strength values are acceptable (about 10° brix to about 15° brix has been found to be useful), but a higher range of from about 10° brix to about 25° brix will work. The diluted pineapple juice is ultracentrifuged to remove particulates, e.g., high molecular weight proteins and poly-saccharides The resulting supernatant is collected and filtered to remove remaining or residual particulates.

The filtrate is then passed through a suitable resin, such as a methanol activated C18 resin. The C18 resin is a silica-based resin having long carbon chains (i.e., 18 carbon atoms) covalently bonded to silica. (Such resins are available from Alltech Associates of Deerfield, Ill.). Other suitable silica resins, however, may be used to practice the methods of the present invention. The C18 resin is then preferably washed with an acidic solution, e.g., 0.01% aqueous HCl to remove undesirable compounds, such as sugars, acids, and other polar compounds.

The constituents of the antibrowning/antioxidlzing compositions are then eluted from the C18 resin using a suitable media, such as methylalcohol. The resulting eluate is preferably stored at about −10° C. for a period of about 12 hours Although storage at about −10° C. is not critical, low-temperature storage seems to hasten precipitation of un-wanted materials. The temperature and time period the eluate is stored is not critical, but a temperature within a range of from about −15° C. to about 5° C. has been found to be useful. The eluate is then passed through a filter media, such as a 0.45 µM membrane filter to remove precipitate. Without being tied to any particular theory, the inventor believes the precipitate comprises polysaccharides or proteins. The filtrate is collected and is preferably evaporated to dryness using a rotary evaporator at about 35° C. Other suitable evaporation methods may be used.

The evaporate is re-dissolved in water or an acidic solution. Re-dissolution in en aqueous acidic solution is preferred for dissolving sinspyl compounds for application to resin. The compounds should be in an aqueous solution for later application to an anion-exchange resin. The sinapyl compounds with their carboxylic acid (anions) will exchange with anions on the resin. It has been found that a more effective evaporation takes place if the sinapyl compounds are re-dissolved in a neutral or acidic environment.

The solution including the re-dissolved constituents is applied to an anion-exchange resin (e.g., a BIOREX-5 anlon-exchange column available from Bio-Rad Laboratories, of Richmond, Calif.). The anion-exchange resin is washed with water to remove neutral phenolic compounds. The composition constituents are then eluted from the anion-exchange resin, preferably using an acidic solution, e.g., a hydrochloric acid solution having a pH of about 1 or less. The eluate is then adjusted to a pH of from about 3 to about 5, and preferably to a pH of about 3.5. The pH of the eluate is adjusted with a basic solution, such as sodium hydroxide or other alkalizing agents such as potassium hydroxide. The eluate is then preferably filtered, preferably through a 0.45 µm membrane. The resulting antibrowning/antioxidation composition may then be used and/or individual components of the composition or combinations of components of the composition may be isolated to form alternative embodiments of the composition of the present invention. One or more of the sinapyl components of the composition may be isolated or separated using any of a variety of suitable methods, such as by high-performance liquid chromatography (HPLC) or by electrophoresis.

Although the method set forth above produces consistent and effective antibrowning, antioxidant compositions, if desired, the concentration of the antibrowning, antioxidation components of the resulting compositions may be determined using analytical HPLC. The resulting compositions may have effective antibrowning, antioxidant characteristics over a broad pH range (i.e., within the range of food product pH values). Food products are typically at a pH range of from about 3 to about 8.

EXAMPLES

The National Food Processors Association (of Washington, D.C.) and Dole Food Company, Inc. (of Westlake Village, Calif.), provided fifty-four pineapple juice concentrate samples. The pineapple juice samples were stored at about −20° C. until use. The pineapple samples were mainly three varieties: Cayenne (from Bukidnon, Philippines), Smooth Cayenne (from Thailand and Philippines), and Champaka (from Maui, Hi.).

About 400 g of pineapple juice concentrate was diluted four fold with deionized water. The diluted pineapple juice was ultracentrifuged at about 23,000 g for about 20 minutes. The supernatant was collected and filtered through Whatman #1 filter paper with a CELITE diatomaceous earth filtration aid (available from Celite Corp. of California). About 100 mL of the filtrate was passed through a methylalcohol activated C18 resin having about 5 g resin (C18 resin available from Alltech Associates of Deerfield, Ill.). The activated C18 resin was then washed with about 100 mL of about 0.01% aqueous HCl and then eluted with about 50 mL of methylalcohol. The about 50 mL of methylalcohol eluate was combined with the about 100 mL of about 0.01% HCl eluate and the eluate mixture was stored for about 12 hours at about −10C. The eluate mixture was then filtered using a 0.45 µm Millipore HA membrane (available from Millipore) to remove precipitate. The filtrate was rotary evaporated substantially to dryness at about 35° C. and re-dissolved in about 10 mL of about 0.01% aqueous HCl:Methylalcohol (at a ratio of about 70:30). The aqueous HCl:Methylalcohol solution was filtered with a 0.45 µm Millipore HA membrane prior to semi-preparative HPLC isolation.

Isolation of Sinapyl Compounds Using Semi-Preparative HPLC

Two Dynamax SD-300 pumps (available from Dynamax Corp. of Houston, Tex.) were used with a semi-preparative Microsorb C18 column (25 cm×21.4 mm, 5 µm) (available from Rainin Instrument Co. of Woburn, Mass.). The end of the C18 column was connected to a flow divider that split a 1 mL/min flow to a HP 1040A Diode Array Detector (DAD) (available from Hewlett Packard of Corvallis, Oreg.) having a detection at 280 nm. The remainder of flow, at 19 mL/min, was directed to an outlet for manual peak collection. The following gradient employing solvent A (methanol) and solvent B (0.07 M K-PO$_4$ buffer, pH 2.4) was used: 7 minutes from 35% to 45% solvent A, then 3 minutes from 45% to 48% solvent A and holding for 5 minutes. Three sinapyl compounds were isolated and identified (i.e., compound 1, S-sinapyl-L-cysteine, compound 2, S-sinapyl glutathione, and compound 3, N-L-γ-glutamyl-S-sinapyl-L-cysteine).

The peak solution purity was verified by analytical HPLC as shown in FIG. 1 (discussed below). Each peak solution collected from the preparative HPLC (i.e., each of the three isolated sinapyl compounds) was rotary evaporated at about 35° C. for about 10 minutes to remove methylalcohol. The isolated solutions were then extracted with a 5 g C18 resin (available from Alltech Associates, Inc. of Deerfield, Ill.). The methylalcohol eluate from the C18 resin was rotary evaporated to dryness and stored at about −15° C. until analysis. As shown on the chromatograph of FIG. 1, peaks 1, 2 and 3 were obtained. The three peak solutions (i.e., compound 1, S-sinapyl-L-cysteine, compound 2, S-sinapyl glutathione, and compound 3, N-L-γ-glutamyl-S-sinapyl-L-cysteine) were further analyzed by analytical HPLC (as discussed below).

Analysis of Isolated Compounds 1, 2, and 3 by Analytical HPLC

A Supelco LC-18 column (25 cm×4.6 mm, 5 µm) was used with a HP 1040A DAD set at 280 nm. The flowrate was set at about 1.0 mL/min, the injection was set at about 50 µL. The following gradient employing methanol (solvent A), acetonitrile (solvent B) and solvent C (0.07 M K-PO$_4$ buffer, pH 2.4) was used: 10 minutes from 10% solvent A/0% solvent B to 22% solvent A/0% solvent B, then 25 minutes from 22% solvent A/0% solvent B to 22% solvent A/25% solvent B, the remainder being solvent C. Approximately 5 mg of compound 1, 50 mg of compound 2, and 50 mg of compound 3 were isolated and identified. Compound 1 was identified as S-sinapyl-L-cysteine; compound 2 was identified as S-sinapyl glutathione, and compound 3 was identified as N-L-γ-glutamyl-S-sinapyl-L-cysteine.

Structural Analysis of Isolated Sinapyl Compounds 2 and 3 by Acid Hydrolysis

Figure 3:
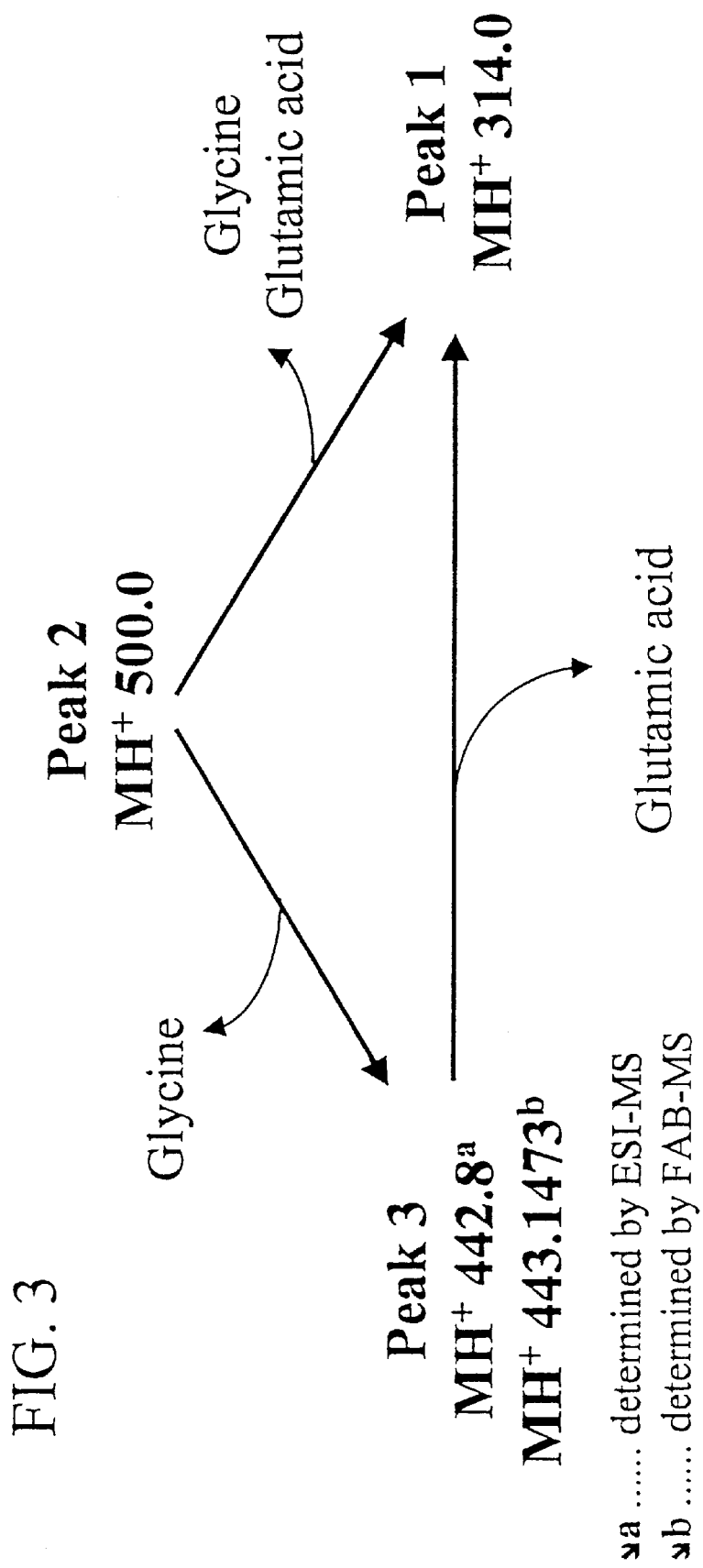
FIG. 3 illustrates an acid hydrolysis pattern of another composition of the present invention.

About 0.5 mg each of compound 2 and compound 3 were acid hydrolyzed in a TEFLON-lined, screw-cap test tube with about 5 mL of about 2 N HCl at about 100° C. for about 30 minutes in the dark (about 10 minutes N$_2$ flushing before hydrolysis). The solution was cooled in ice-bath and extracted with C18 Sep-Pak (360 mg resin) (available from Waters Associates of Milford, Mass.). The methylalcohol eluate of the Sep-Pak was rotary evaporated to dryness and re-dissolved in an about 0.01% aqueous HCl solution and analyzed by HPLC using the same conditions as described above. Sinapyl compounds 2 and 3 of the present invention were identified. The acid hydrolysis pattern of the sinapyl compounds was thus determined, as shown in FIG. 3.

Structural Analysis of Sinapyl Compounds by Amino Acid Analysis

About 200 µL of the methylalcohol eluate from the isolation step above was transferred to a 1.5-mL TEFLON-lined screw-cap reaction tube. The eluate was flushed dry with N$_2$, dissolved in about 120 µL of an about 6 N HCl solution and flushed with N$_2$ for about one minute and the tube was capped. Hydrolysis was performed in a heating block at about 95° C. for about 3 hours. An amino acid analysis was performed on the hydrolysate using a PITC derivatization as described by Hagen et al. in *Food Chem.* 46:319–323, 1993. The identity of hydrolyzed amino acids were confirmed by spiking sample with the standard PITC derivatives.

Structural Analysis of Sinapyl Compounds by Mass Spectrometry

Electrospray ionization mass spectrometry (ESI-MS) were performed using a Perkin Elmer Sciex API III+ triple quadrupole ionspray mass spectrometer (available from Perkin Elmer of Ontario, Canada) by pneumatically assisted electrospray to determine the molecular weights of the sinapyl compounds. The operating conditions were standard, as known to persons skilled in the art. Tandem MS/MS were recorded on the same instrument using Ar—N$_2$ (9:1) as a target gas mixture. The collision energy was at about 15 to about 25 V. Operating conditions were again standard, as known to persons skilled in the art. A fast atom bombardment mass spectrometry sample was prepared in a matrix of about a 0.1 N toluenesulfonic acid solution in 1:1 glycerol/3-nitrobenzyl alcohol solution. The positive spectra were recorded on a Kratos M550TC instrument (available from Kratos Analytical, Ltd. of Manchester, England) at a scan speed of about 10 sec/decade using a resolution of 1100 with a gun producing a 7 KV beam of Xenon atoms.

Structural Analysis of Sinapyl Compounds by Nuclear Magnetic Resonance (NMR)

Figure 2:
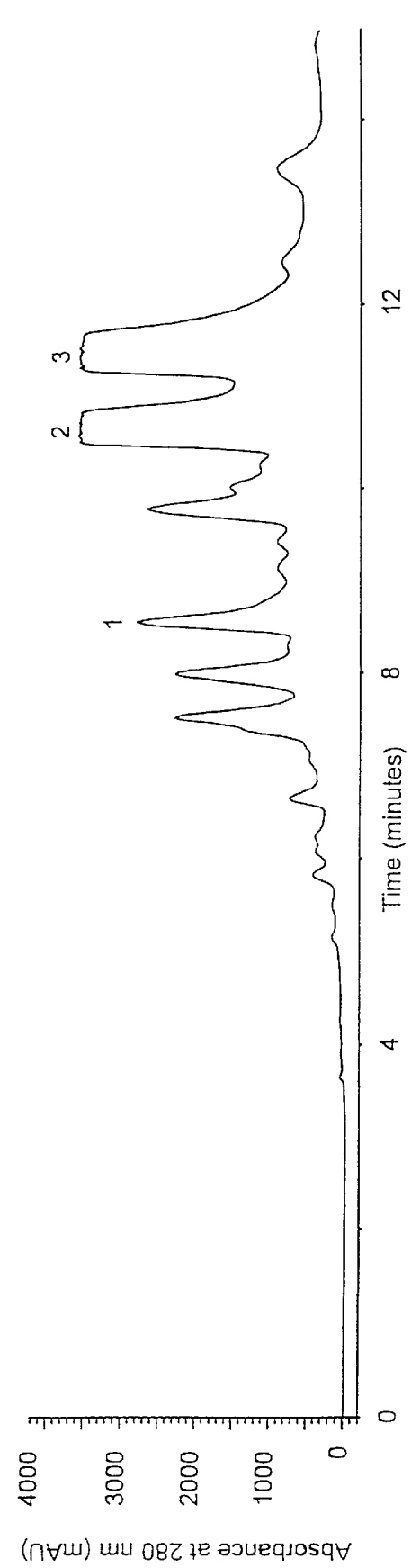
FIG. 2 is a semi-preparative HPLC chromatogram of another composition of the present invention.

NMR was used to confirm the glutathione structure in peak 1 of FIGS. 1 and 2 and to confirm the sinapyl structure of compounds 1, 2, and 3 of the present invention. Referring to Table 1, $^1$H (600 MHz) and $^{13}$C (150 MHz) NMR spectra were recorded at about 25° C. using a Bruker DRX 600 NMR Spectrometer (available from Bruker Instruments, Inc. of Billierica, Mass.). A mixed solvent comprising D$_2$O:CD$_3$OD:CF$_3$COOD at about 60:30:10 by volume and a residual D$_2$O resonance was used as internal chemical shift reference. A $^1$H-$^1$H correlation spectroscopy (COSY) and a total correlation spectroscopy (TOCSY), a $^1$H-$^{13}$C heteronuclear multiple bond quantum correlation (HMQC), and a heteronuclear multiple bond correlation (HMBC) analysis were performed using a standard pulse sequence, as known to persons skilled in the art. Spectral widths of about 10 ppm and 200 ppm were used in the $^1$H and $^{13}$C dimensions, respectively.

S-sinapyl-L-cysteine, compound 1, was identified as, a slightly yellow solid, having the following parameters: ESI-MS m/z of 314.0 (MH$^+$), 192.8 (MH$^V$-cysteine), 160.8 MS/MS of daughter ion (m/z 192.8, collision energy 25 volts) m/z (rel. int.): 192.8 (20), 161.2(100), 143.2 (15), 133.2(100), 115.0 (60), 105.2 (100), 79.0 (15), 55.0 (8). An ultraviolet spectrum showed a λ$_{max}$ of 285 nm (mobile phase). For the $^1$H NMR results, see Table 1.

S-sinapyl glutathione, compound 2, was identified as a slightly yellow solid having the following parameters: ESI-MS m/z 500.0 (MH$^+$), 308.0 (Glutathione.H$^+$), 192.8 (MH$^+$-Glutathione). An ultraviolet spectrum was obtained that was identical to that UV spectrum from compound 1, as discussed above. For the $^1$H and $^{13}$C NMR results see Tables 1 and 2. For the $^1$H-$^{13}$C HMQC results see Table 3.

N-L-γ-glutamyl-S-sinapyl-L-cysteine, compound 3, was also identified as a slightly yellow solid having the following parameters: ESI-MS m/z of 442.8 (MH$^+$), 250.8 (Glu-Cys.H$^+$), 192.8 (MH$^+$-Glu-Cys). A FAB-MS m/z of about 443.1 (calculated for $C_{19}H_{27}O_8N_2S_1$: 443.1458; deviation: −3.4 ppm). An ultraviolet spectrum of N-L-γ-glutamyl-S-sinapyl-L-cysteine is the same as for compounds 1 and 2. For the $^1$H NMR results see Table 1. The $^1$H NMR results provide information for interpretation of the ultraviolet spectra. Such measurements give the electromagnetic information characteristics of different protons.

Results for mass spectral analysis of a sinapyl alcohol standard (available from Aldrich of Milwaukee, Wis.) had the following parameters: ESI-MS m/z of 193.0 (MH$^+$-H$_2$O), a MS/MS (collision energy 15 volts) m/z (rel. int.) of 192.8 (16), 161.2 (80), 143.2 (5), 133.2 (83), 115.0 (45), 105.2 (100), 79.0 (10), 55.0 (5) and an ultraviolet spectrum that was the same as other sinapyl derivatives (in the mobile phase). Sinapyl alcohol was used as a reference standard. Sinapyl alcohol's structural similarity to the sinapyl compounds of the present invention provide appropriate reference points for interpretation of ultraviolet and mass spectral data.

TABLE 1

$^1$H NMR Data for Compounds 1, 2 and 3*

| H | Compound 1* | Compound 2* | Compound 3* |
|---|---|---|---|
| 2, 6 | 6.44 s | 6.35 s | 6.40 s |
| 7 | 6.13 d (15.6) | 6.04 d (15.6) | 6.08 d (15.6) |
| 8 | 5.78 dt (15.6, 7.8) | 5.69 dt (15.6, 7.8) | 5.73 dt (15.6, 7.8) |
| 9 | 3.07 d (7.8) | 2.94 d (7.8) | 3.00 d (7.8) |
| 1', 2" | 3.54 s | 3.47 s | 3.51 s |
| 2' | — | 3.58 s | — |
| 4' | 3.95 dd (7.8, 4.2) | 4.20 t (6.6) | 4.26 dd (8.4, 4.8) |
| 6' | — | 2.18 t (7.2) | 2.21 t (7.2) |
| 7' | — | 1.86 dt (7.2, 7.2), 1.80 dt (7.2, 7.2) | 1.90 dt (7.2, 7.2), 1.84 dt (7.2, 7.2) |
| 8' | — | 3.69 t (6.6) | 3.74 t (6.6) |
| 10' | 2.86 dd (15.0, 4.2), 2.71 dd (15.0, 7.8) | 2.60 dd (13.8, 4.8), 2.44 dd (13.8, 8.4) | 2.69 dd (13.8, 4.8), 2.52 dd (13.8, 8.4) |

Coupling constant (J in Hz) given in parentheses
Chemical shifts assigned by comparison to chemical shift pattern of compounds.
*Compound 1 is S-sinapyl-L-cysteine; compound 2 is S-sinapyl glutathione; Compound 3 is N-L-γ-glutamyl-S-sinapyl-L-cysteine.

TABLE 2

$^{13}$C NMR Spectral Data for Compound 2*

| C | ppm |
|---|---|
| 1 | 128.7 |
| 2 | 104.0 |
| 3 | 147.7 |
| 4 | 134.3 |
| 5 | 147.7 |
| 6 | 104.0 |
| 7 | 132.6 |
| 8 | 123.6 |
| 9 | 34.0 |
| 1", 2" | 56.3 |
| 1' | 172.6 |
| 2' | 41.0 |
| 3' | 172.7 |
| 4' | 53.2 |
| 5' | 174.0 |
| 6' | 31.0 |

TABLE 2-continued $^{13}$C NMR Spectral Data for Compound 2*

| C | ppm |
|---|---|
| 7' | 25.5 |
| 8' | 52.2 |
| 9' | 171.2 |
| 10' | 31.9 |

1' and 3' are overlapping.
*Compound 2 is S-sinapyl-L-cysteine.

The $^{13}$C NMR data list in Table 2 aids in the determination of the carbon skeleton of the component compounds of the present invention compositions. That is, such data (along with the HMBC data shown in Table 3 discussed below aids in final determination of the structure of the component compounds of the present inventions compositions.

TABLE 3

Cross-Peaks in HMBC Spectra of Compound 2*

| | C | |
|---|---|---|
| H | 3-bond | 2-bond |
| 2, 6 | 6, 2, 4, 7 | 3, 5 |
| 7 | 2, 6, 9 | 1 |
| 8 | 1 | 9 |
| 9 | 7, 10' | 8 |
| 1", 2" | 3, 5 | |
| 2' | 3' | 1' (?) |
| 4' | 5' | 3', 10' |
| 6' | 8' | 5', 7' |
| 7' | 5', 9' | 6', 8' |
| 8' | 6' | 7', 9' |
| 10' | 9, 3' | 4' |

*Compound 2 is S-sinapyl-L-cysteine.

The heteronuclear multiple bond correlation (HMBC) data shown in Table 3 is the resulting data of an NMR technique useful for identifying the neighboring carbon to a proton of component compounds of the present invention compositions.

Antioxidant Properties of the Present Invention Compositions

Sample Preparation for Measurement of Antioxidant Properties

About 4.2 ml of methanol and about 10 liters of about 1N HCl were added to about 2.1 mg of S-sinapyl glutathione (having a molecular weight of about 499). The mixture was vortexed until the S-sinapyl compound was completely dissolved (1 mM final).

About 4.98 ml of methanol and about 10 liters of about 1N HCl were added to about 2.2 mg of N-L-γ-glutamyl-S-sinapyl-L-cysteine (having a molecular weight of about 442). The mixture was vortexed until the sinapyl compound was completely dissolved (1 mM final).

Prior to the ACW analysis, the 1 mM solutions of N-L-γ-glutamyl-S-sinapyl-L-cysteine and S-sinapyl glutathione were diluted about 1:100 with methanol (about 0.01 mM final) and then about 10 liters of sample (at about 0.1 nmol) were assayed. Prior to ACL analysis, the 1 mM solutions of N-L-γ-glutamyl-S-sinapyl-L-cysteine and S-sinapyl glutathione were diluted about 1:1 0 with methanol (about 0.1 mM final) and then about 10 liters of sample (at about 1 nmol) were assayed.

Antioxidant Capacity Water Soluble Assay (Water Based PCL Assay)

Assayed compounds compete with photo-sensitizer (luminol) for interaction with superoxide radicals produced by UV irradiation, resulting in a delay of the propagating phase of kinetic curve of chemiluminescence. The delay was expressed as a lag-time in seconds. TROLOX, an excellent antioxidant, a water-and methanol-soluble analog of alpha-tocopherol (i.e., 6-hydroxy-2, 5, 7, 8-tetramethylchroman-2-carboxylic acid), was used as a reference antioxidant (TROLOX is available from Aldrich of Milwaukee, Wis.). A calibration curve for TROLOX was generated by plotting a shift in lag-time (lag sample versus lag control) against the amount of TROLOX taken for the assay. The results are expressed as a molar ratio of (antioxidant capacity) AOC of the assayed compound of the present invention to the AOC of TROLOX. In the water-based PCL assay, TROLOX mimics the AOC of ascorbic acid, a known antioxidant. Comparison of present compositions to TROLOX are discussed below and tabulated in Table 4.

Antioxidant Capacity Lipid Soluble Assay (MeOH Based PCL Assay)

Assayed compounds compete with photo-sensitizer (luminol) for interaction with superoxide radicals produced by UV irradiation resulting in an inhibition of the intensity of chemiluminescent signal. The measured parameter was an area under the kinetic curve of the light output (A). Inhibition (I) of chemiluminescence was calculated as I=1−A/$A_0$, wherein $A_0$ is the area under the control (the non-antioxidant present) curve. A calibration curve was generated from a plot of the inhibition versus the amount of TROLOX. The results (mean) are expressed as a molar ratio of the AOC of the assayed compound of the present invention to the AOC of TROLOX. In the MeOH-based PCL assay, TROLOX mimics the AOC of alphatocopherol. Comparison of present compositions to TROLOX are discussed below and tabulated in Table 4.

Antioxidant Effectiveness of the Present Invention Sinapyl Compositions

The antioxidant capacity (AOC) of two of the three sinapyl derivatives (S-sinapyl glutathione, and N-L-γ-glutamyl-S-sinapyl-L-cysteine) was measured in water-soluable and methanol-soluble photo-chemiluminescent assays. AOCs of the sinapyl compositions of the present invention were expressed in AOCs of TROLOX (i.e., the standard or reference antioxidant).

As shown in Table 4, both S-sinapyl glutathione, and N-L-γ-glutamyl-S-sinapyl-L-cysteine demonstrated antioxidant capacities comparable to that of TROLOX, both in water and in methanol soluble assays. There also appears to be positive health benefits of such antioxidant compositions of the present invention.

TABLE 4

| Sample | AOC (mol of sample necessary to match AOC of 1 mol of TROLOX) | |
|---|---|---|
| | Water-Based PLC Assay* | MeOH-Based PLC Assay* |
| S-sinapyl glutathione | 1.22 ± 0.03 | 3.25 ± 0.10 |
| N-L-γ-glutamyl-S-sinapyl-L-cysteine | 1.56 ± 0.20 | 4.53 ± 0.20 |

*Data represent mean ± SD from triplicate measurements.

Results of Isolation and Identification of the Present Invention Compositions

S-sinapyl-L-cysteine, S-sinapyl glutathione, and N-L-γ-glutamyl-S-sinapyl-L-cysteine were extracted from pineapple juice or pineapple process waste streams and analyzed as discussed above. FIG. 1 shows the analytical HPLC chromatogram of pineapple juice with peaks 1, 2 and 3 being the three phenolic compounds (i.e., S-sinapyl-L-cysteine, S-sinapyl glutathione, N-L-γ-glutamyl-S-sinapyl-L-cysteine). FIG. 2 shows a semi-preparative HPLC chromatogram of pineapple juice after a C18 resin fractionation that resulted in isolation of the three compounds (i.e., S-sinapyl-L-cysteine, S-sinapyl glutathione, N-L-γ-glutamyl-S-sinapyl-L-cysteine) (labeled peaks 1, 2 and 3) without impurities.

FIG. 3 shows a resulting acid hydrolysis pattern of compounds 2 and 3 (i.e., S-sinapyl glutathione, N-L-γ-glutamyl-S-sinapyl-L-cysteine, respectively). The acid hydrolysis of compound 2 generated compounds 1, 3, and an additional compound having an identical ultraviolet spectrum. Acid hydrolysis of compound 3 (i.e., N-L-γ-glutamyl-S-sinapyl-L-cysteine) generated only compound 1 (i.e., S-sinapyl-L-cysteine).

Figure 4:
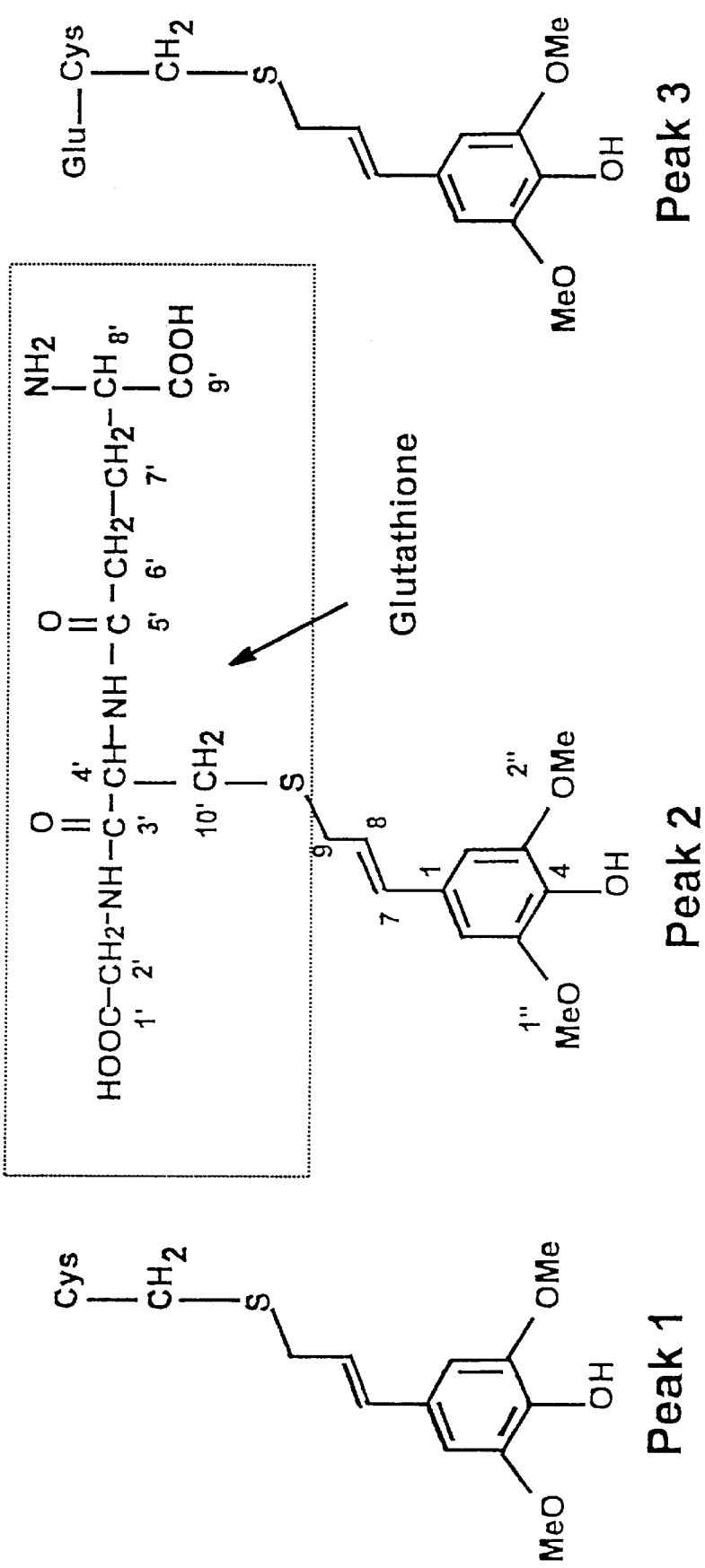
FIG. 4 is the identification of compounds as identified in an ultra-violet spectrum of another composition of the present invention.

Proton NMR spectra of S-sinapyl-L-cysteine, N-L-γ-glutamyl-S-sinapyl-L-cysteine, and S-sinapyl glutathione all exhibit resonances with chemical shifts at 6.4, 6.0, 5.5, 3.5 and 3.0 ppm. The 6.4 ppm chemical shift is the characteristic resonance of aromatic protons, while 6.0 and 5.5 ppm shifts are traits of double-bond protons. The final structure was established using $^{13}$C NMR (see Table 2), HMQC and HMBC (see Table 3). The same ultraviolet spectrum (resulting structure identification shown in FIG. 4) and fragmentation pattern as a sinapyl alcohol standard further confirmed the sinapyl core structure of the sinapyl compounds of the present compositions. The two protons at the C-2 and C-6 positions undergo deuterium exchange under very acidic condition when kept at room temperature for over two days. This exchange was followed by $^1$H NMR resulting in the almost complete loss of proton chemical shifts at 6.4 ppm. The deuterium exchange was further confirmed by 2 mass units increase in the fragment ion corresponding to the sinapyl moiety [m/z (without deuterium exchange): 193] in the ESI-MS. This deuterium exchange can be used to establish the fragmentation pathway during MS/MS by comparing the fragmentation pattern of the compound with that of the deuterium-exchanged compound.

Whereas the invention has been described with reference to particular compositions and methods, it will be understood that the invention is not limited to those particular compositions and methods. On the contrary, the invention is intended to encompass all modifications, alternatives, and equivalents as may be included within the spirit and scope of the invention as defined by the appended claims.

What is claimed is:

1. An antibrowning and antioxidant composition comprising:
   a sinapyl compound that has been isolated from a natural source.

2. The composition of claim 1, wherein the natural source comprises pineapple juice.

3. The composition of claim 1, wherein the sinapyl compound isolated from a natural source further comprises a compound selected from a group consisting essentially of S-sinapyl-L-cysteine, N-L-γ-glutamyl-S-sinapyl-L-cysteine, S-sinapyl glutathione, and mixtures thereof.

4. The composition of claim 1, wherein the natural source comprises pineapple juice and the sinapyl compound isolated from the natural source comprises a compound selected from a group consisting essentially of S-sinapyl-L-cysteine, N-L-γ-glutamyl-S-sinapyl-L-cysteine, S-sinapyl glutathione, and mixtures thereof.

5. An antibrowning and antioxidant food preparative composition for use with fruit and fruit products, comprising:

a mixture of S-sinapyl-L-cysteine, N-L-γ-glutamyl-S-sinapyl-L-cysteine, and S-sinapyl glutathione, isolated from a natural source.

6. The composition of claim 5, wherein the mixture of S-sinapyl-L-cysteine, N-L-γ-glutamyl-S-sinapyl-L-cysteine, and S-sinapyl glutathione is isolated from pineapple juice.

7. An antibrowning and antioxidant food preparative composition consisting essentially of S-sinapyl-L-cysteine, N-L-γ-glutamyl-S-sinapyl-L-cysteine, and S-sinapyl glutathione.

8. The composition of claim 7, wherein the S-sinapyl-L-cysteine, N-L-γ-glutamyl-S-sinapyl-L-cysteine, and S-sinapyl glutathione are isolated from pineapple juice.

9. A method of making an antibrowning and antioxidant composition comprising:

extracting juice from a pineapple; and isolating a sinapyl compound from the juice.

10. The method of claim 9, wherein isolating a sinapyl compound from the juice further comprises isolating S-sinapyl-L-cysteine, N-L-γ-glutamyl-S-sinapyl-L-cysteine, or S-sinapyl glutathione from the juice.

11. The method of claim 9, wherein isolating a sinapyl compound further comprises:

applying juice extracted from a pineapple to a resin column; and eluting a first eluate including the sinapyl compound from the resin.

12. The method of claim 11, further comprising:

applying the first eluate to an anion-exchange resin.

13. The method of claim 11, further comprising:

applying the first eluate to an anion-exchange resin;

eluting neutral phenolic compounds from the anion-exchange resin to remove the neutral phenolic compounds from the first eluate; and eluting a second eluate including the sinapyl compound from the anion-exchange resin.

14. The method of claim 13, wherein the second eluate is eluted from the anion-exchange resin by application of an acidic liquid to the anion-exchange resin.

15. The method of claim 14, further comprising neutralizing the second eluate to a pH value of from about 3 to about 8.

16. A method of preparing fruit or fruit products to substantially inhibit browning and oxidation thereof, the method comprising:

applying a composition consisting of sinapyl compounds to the fruit or fruit products.

17. The method of claim 16, wherein the sinapyl compounds are selected from a group consisting essentially of S-sinapyl-L-cysteine, N-L-γ-glutamyl-S-sinapyl-L-cysteine, S-sinapyl glutathione, and mixtures thereof.

18. The method of claim 16, further comprising isolating sinapyl compounds from pineapple juice prior to application of the sinapyl compounds to the fruit or fruit product.

19. The method of claim 16, further comprising:

isolating S-sinapyl-L-cysteine, N-L-γ-glutamyl-S-sinapyl-L-cysteine, S-sinapyl glutathione, and mixtures thereof from pineapple juice prior to application of such sinapyl compounds to the fruit or fruit product.

20. A method of preparing fruit or fruit products to substantially inhibit browning and oxidation thereof, the method comprising:

applying a composition consisting essentially of sinapyl compounds to the fruit or fruit products, wherein the sinapyl compounds are selected from a group consisting of S-sinapyl-L-cysteine, N-L-γ-glutamyl-S-sinapyl-L-cysteine, S-sinapyl glutathione, and mixtures thereof.

21. The method of claim 20, further comprising isolating sinapyl compounds from pineapple juice prior to application of the sinapyl compounds to the fruit or fruit product.

22. An antibrowning and antioxidant food preparative composition for use with fruit and fruit products, comprising:

a mixture of S-sinapyl-L-cysteine, N-L-γ-glutamyl-S-sinapyl-L-cysteine, and S-sinapyl glutathione, extracted from a natural source, wherein the mixture provides consistent antibrowing and antioxidation regardless of the composition of natural source from which it is extracted.

\* \* \* \* \*

UNITED STATES PATENT AND TRADEMARK OFFICE
CERTIFICATE OF CORRECTION

PATENT NO. : 6,224,926 B1  
DATED : May 1, 2001  
INVENTOR(S) : Wrolstad et al.

It is certified that error appears in the above-identified patent and that said Letters Patent is hereby corrected as shown below:

Column 10,
Line 12, Table 2, "S-sinapyl-L-cysteine" should read -- S-sinapyl glutathione --.
Line 36, Table 3, "S-sinapyl-L-cysteine" should read -- S-sinapyl glutathione --.

Signed and Sealed this

Fifteenth Day of October, 2002

*Attest:*

*Attesting Officer*

JAMES E. ROGAN
*Director of the United States Patent and Trademark Office*